US010365378B2

(12) United States Patent
Nelson et al.

(10) Patent No.: US 10,365,378 B2
(45) Date of Patent: Jul. 30, 2019

(54) ACTIVE DOSIMETER SYSTEMS FOR REAL-TIME RADIATION DOSE MEASUREMENTS

(71) Applicant: THERMO EBERLINE LLC, Oakwood Village, OH (US)

(72) Inventors: Greg Holger Nelson, Ithaca, NY (US); Phillip Edward Beeson, Dorset (GB); Alan John Laing, Dorset (GB)

(73) Assignee: THERMO EBERLINE LLC, Oakwood Village, OH (US)

( * ) Notice: Subject to any disclaimer, the term of this patent is extended or adjusted under 35 U.S.C. 154(b) by 41 days.

(21) Appl. No.: 15/430,867

(22) Filed: Feb. 13, 2017

(65) Prior Publication Data

US 2017/0248703 A1    Aug. 31, 2017

Related U.S. Application Data

(60) Provisional application No. 62/301,005, filed on Feb. 29, 2016.

(51) Int. Cl.
*G01T 1/02* (2006.01)
*G01T 7/00* (2006.01)

(52) U.S. Cl.
CPC ............... *G01T 1/026* (2013.01); *G01T 7/00* (2013.01)

(58) Field of Classification Search
CPC ...................................................... G01T 1/026
See application file for complete search history.

(56) References Cited

U.S. PATENT DOCUMENTS

| 4,695,730 A | 9/1987 | Noda et al. |
| 5,151,600 A * | 9/1992 | Black ............. G02C 11/00 250/372 |

(Continued)

FOREIGN PATENT DOCUMENTS

| CN | 102901978 A | 1/2013 |
| CN | 102966414 A | 1/2013 |

(Continued)

OTHER PUBLICATIONS

Database Compendex El, Inc., NY, NY, Mar. 24, 2016, Donmoon et al., "Radiation exposure to nuclear medicine staffs during <18>F-FDG PET/CT procedures at Ramathibodi Hospital," Database acc. No. E20162302476249 *abstract* & Journal of Physics: Conf. Series—13th Southeast Asian Congress of Med. Phys. 2015, Seacomp 2015 20160324 Inst. of Physics Publishing GBR, vol. 694, No. 1, 10.

*Primary Examiner* — Yara B Green
(74) *Attorney, Agent, or Firm* — William R. McCarthy, III

(57) ABSTRACT

An embodiment of an active dosimeter system for detecting and communicating a radiation dose in real time is described that comprises a peripheral detector configured to be worn on an extremity or a head region of a user that includes a radiation sensor to detect ionizing radiation; a processor to determine a level of the ionizing radiation; and a wireless device to send a transmission comprising the detected level of the ionizing radiation; where the determination of the level of ionizing radiation and the transmission occur in real-time; and a receiver located in close proximity to the user that receives the transmission, and comprises an interface that informs the user of the detected level of the ionizing radiation.

36 Claims, 3 Drawing Sheets

(56) References Cited

U.S. PATENT DOCUMENTS

| | | | |
|---|---|---|---|
| 5,235,318 A | 8/1993 | Schulcz | |
| 8,822,924 B2 | 9/2014 | Valentino et al. | |
| 9,429,661 B2 | 8/2016 | Valentino et al. | |
| 2005/0113650 A1* | 5/2005 | Pacione | A61B 5/411 600/300 |
| 2005/0230596 A1 | 10/2005 | Howell et al. | |
| 2007/0075251 A1* | 4/2007 | Doughty | G01T 1/026 250/370.01 |
| 2011/0115629 A1* | 5/2011 | Holler | G06Q 10/00 340/572.1 |
| 2012/0268279 A1 | 10/2012 | Hatch | |
| 2013/0033700 A1* | 2/2013 | Hallil | G01B 11/00 356/72 |
| 2014/0312242 A1 | 10/2014 | Valentino et al. | |
| 2015/0268355 A1 | 9/2015 | Valentino et al. | |

FOREIGN PATENT DOCUMENTS

| | | |
|---|---|---|
| CN | 202837555 U | 3/2013 |
| CN | 105054507 A | 11/2015 |
| EP | 2515145 A1 | 10/2012 |
| GB | 2516797 B2 | 11/2015 |
| JP | 2001281339 A | 10/2001 |
| JP | 2007139435 A | 6/2007 |
| JP | 2014235037 A | 12/2014 |
| KR | 101574076 B1 | 12/2015 |
| WO | 2014191957 A1 | 12/2014 |
| WO | WO2016054396 A1 | 4/2016 |

\* cited by examiner

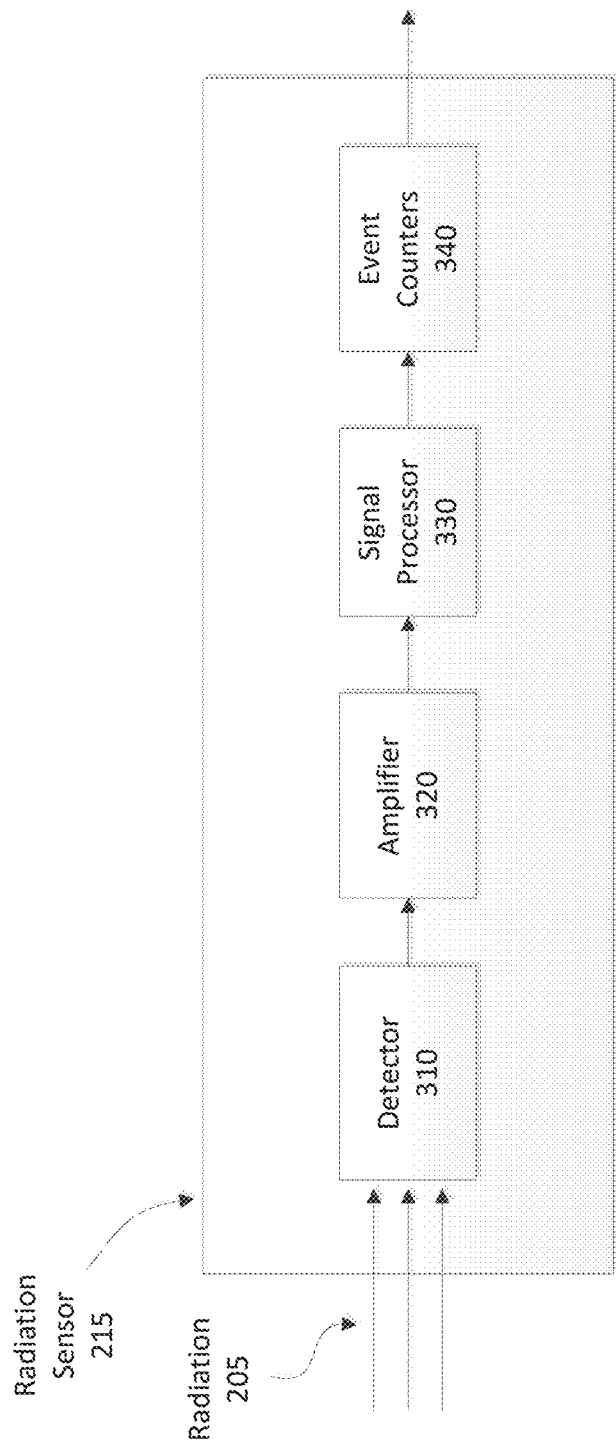

ACTIVE DOSIMETER SYSTEMS FOR REAL-TIME RADIATION DOSE MEASUREMENTS

CROSS-REFERENCE TO RELATED APPLICATION

This application claims the benefit of U.S. provisional patent application No. 62/301,005, filed Feb. 29, 2016. The contents of this application are incorporated by reference in their entirety.

FIELD OF THE INVENTION

The invention relates to active radiation dosimeters and methods for their use.

BACKGROUND OF THE INVENTION

Radiation dosimeters generally refer to devices that measure exposure to ionizing radiation and play vital role for workers in certain industries where there is routine radiation exposure. It is important for these workers to monitor the cumulative dose over time to ensure that their exposure does not exceed safe levels. There are a number of types of radiation dosimeters available that fall into two general classes. The first class is referred to as a "passive" dosimeter that is sensitive to ionizing radiation and records a value of cumulative radiation dose (sometimes referred to as an "effective dose" or "equivalent dose" value measured in "sieverts" (e.g. Sv)). Typical embodiments of passive dosimeter do not have the capability to actively communicate the dose value to the user. The second class of dosimeter is referred to as an "active" dosimeter, which provides a communication reporting of the dose value to the user. Also, many embodiments of active dosimeter typically include an alarm function that provides the user with an audible and/or visual indication that a threshold dose value has been reached.

Active dosimetry for ionizing radiation has traditionally focused on measurements of what is referred to as a "personal dose equivalent". The term "personal dose equivalent" as used herein generally refers to a quantity of ionizing radiation representing a safety threshold for exposure recommended by the International Commission on Radiation Units and Measurements (ICRU) for the dose equivalent in tissue at depth (d) below a specified point on the body. Examples of personal dose equivalents include a deep dose equivalent safety threshold value of about $H_p(10)$ (e.g. for thoracic exposure) and a surface dose equivalent safety threshold value of about $H_p(0.07)$ (e.g. for skin exposure). Those of ordinary skill in the related art appreciate that it is advantageous to separately monitor dose equivalent values for extremities (fingers, hands, wrists) and eye doses that may include a safety threshold value of about $H_p(3)$ for personnel who may be routinely exposed as part of their profession, such as for example personnel who work in the fields of interventional radiology and cardiology as well as the nuclear power industry.

Passive dosimetry devices, such as thermoluminescent dosimeters (TLD) or what are referred to as "integrating dosimeters", have been used to monitor extremity exposure to radiation. Some embodiments of integrating dosimeter may be able to communicate a reading to the user, however such devices do not provide real-time notification to users when they are receiving potentially damaging radiation exposure. Rather, embodiments of integrating dosimeter devices provide a one-time cumulative reading of exposure that occurs over an extended period of time, where the exposure reading is typically provided when it is too late to take action during the period of actual exposure to the ionizing radiation. True active dosimetry provides a significant benefit over passive dosimetry because users can be informed in "real-time" when they have entered a radiation field that poses a short or long term danger, and providing the users with the opportunity to remove themselves from harm's way. The term "real-time" as used herein typically refers to reporting, depicting, or reacting to events at the same rate and sometimes at the same time as they unfold, rather than delaying a report or action.

Traditional active dosimeters have been too bulky to wear (e.g. over 2.5 cm wide, 40 cc in volume, and 50 gm) anywhere other than on a user's torso. For example, traditional bulky and heavy active dosimeters can be distracting to a user, increase user fatigue, and limit a user's freedom of movement. All of these aspects of traditional active dosimeters hinder the user's ability to effectively perform tasks required by their job.

Therefore, it is appreciated that it is highly desirable to have a light and compact active dosimetry device that is comfortably wearable on or near the extremities, including fingers, hands, wrists, legs, ankles, feet, brain, uterus (e.g. for measuring fetal exposure), and eyes.

SUMMARY

Systems, methods, and products to address these and other needs are described herein with respect to illustrative, non-limiting, implementations. Various alternatives, modifications and equivalents are possible.

An embodiment of an active dosimeter system for detecting and communicating a radiation dose in real time is described that comprises a peripheral detector configured to be worn on an extremity or a head region of a user that includes a radiation sensor to detect ionizing radiation; a processor to determine a level of the ionizing radiation; and a wireless device to send a transmission comprising the detected level of the ionizing radiation; where the determination of the level of ionizing radiation and the transmission occur in real-time; and a receiver located in close proximity to the user that receives the transmission, and comprises an interface that informs the user of the detected level of the ionizing radiation.

Also, in some embodiments the peripheral detector communicates with the receiver which is itself a whole-body dosimeter or another piece of personal protective equipment (PPE) that comprises a user interface. Informing the user may comprise notification (visual, auditory, or tactile alerts related to specific thresholds), and may comprise quantification (visual, auditory, or tactile representation proportional to the detected level).

The above embodiments and implementations are not necessarily inclusive or exclusive of each other and may be combined in any manner that is non-conflicting and otherwise possible, whether they are presented in association with a same, or a different, embodiment or implementation. The description of one embodiment or implementation is not intended to be limiting with respect to other embodiments and/or implementations. Also, any one or more function, step, operation, or technique described elsewhere in this specification may, in alternative implementations, be combined with any one or more function, step, operation, or technique described in the summary. Thus, the above embodiment and implementations are illustrative rather than limiting.

BRIEF DESCRIPTION OF THE DRAWINGS

The above and further features will be more clearly appreciated from the following detailed description when taken in conjunction with the accompanying drawings. In the drawings, like reference numerals indicate like structures, elements, or method steps and the leftmost digit of a reference numeral indicates the number of the figure in which the references element first appears (for example, element 110 appears first in FIG. 1). All of these conventions, however, are intended to be typical or illustrative, rather than limiting.

FIG. 3 is a simplified graphical representation of one embodiment of the radiation sensor of FIG. 2 that comprises a detector, an amplifier, a signal processing function, and one or more event counters.

Like reference numerals refer to corresponding parts throughout the several views of the drawings.

DETAILED DESCRIPTION OF EMBODIMENTS

As will be described in greater detail below, embodiments of the described invention include an active dosimeter system configured as a peripheral detector wearable on the extremities or head region of a user that provides real-time communication to a receiver device located in close proximity to the user. In addition, some embodiments include a wearable peripheral detector that comprises a radiation sensor and a wear sensor configured to detect one more signals from the user indicating that the peripheral detector is being worn on the user's body.

Figure 1:
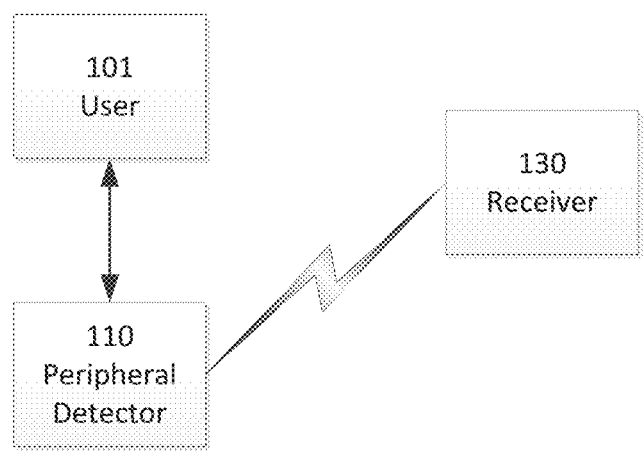
FIG. 1 is a simplified graphical representation of one embodiment of a peripheral detector wearable by a user and a receiver.

FIG. 1 provides a simplified illustrative example of peripheral detector 110 that is worn in close proximity to an extremity or head area by user 101. The extremity may be a finger, hand, wrist, arm, ankle, leg, or any other area of the body that might need to be separately monitored for radiation dose. For example, the peripheral monitoring function might also be applied to supplemental fetal exposure monitoring for a declared pregnant worker. FIG. 1 also illustrates receiver 130 that receives one or more wireless communications from peripheral detector 110 and provides user 101 with real-time information on radiation dose detected by peripheral detector 110 based on the communications received. In the described embodiments, receiver 130 is located in close proximity to user 101 and may include a device such as a piece of personal protective equipment (e.g. a whole-body dosimeter or another detector) worn by user 101 that comprises a processor, data storage element and a user interface such as a display (e.g. graphical user interface (GUI) or other type of interface) and/or speaker interface for audible communication (e.g. an alert message or alarm). For example, the processor in the whole body dosimeter may combine the level of ionizing radiation detected by peripheral detector 110 with a level of ionizing radiation detected by the whole-body dosimeter. In the present example, the combined levels of ionizing radiation from peripheral detector and whole-body dosimeter may be configured as multiple dose variables in a user's dose record that is stored in the whole-body dosimeter (at least for an interim period) and communicated to a centralized data repository.

Alternatively, receiver 130 may include a smart phone, tablet, or other general purpose wireless-capable device. Further, receiver 130 may include a wearable device, such as a ring or bracelet that is specifically intended to provide notifications to the wearer. Such a wearable device may comprise an interface that informs the user of radiation events. The term "close proximity" as used herein in reference to the spatial relationship between receiver 130 and user 101 generally refers to a location within a range where user 101 can unambiguously identify a signal from receiver 130 and respond accordingly. For example, an acceptable range may depend on the type and/or intensity of signal or combination of signals provided by receiver 130 such as audible, visual, or mechanical (e.g. vibration) signals. Also, some or all embodiments of receiver 130 may include a processor or microprocessor as well as data storage elements.

In some embodiments of the described invention peripheral detector 110 and/or receiver 130 may additionally provide electronic access control and/or tracking capabilities to allow and/or track when user 101 is at particular locations such as where security permissions are required. For example, peripheral detector 110 and/or receiver 130 may include some form of what is referred to as Radio-frequency identification (RFID) or other suitable technology that is recognizable by security devices controlling access to locations where access is limited and/or is tracked. In the present example, the RFID element in peripheral detector 110 and/or receiver 130 identifies user 101 to the security device, and if appropriate permissions have been granted will allow user 101 access to the location. Also, peripheral detector 110 and/or receiver 130 can record data that identifies when user 101 is at the location.

Also in some embodiments, peripheral detector 110 and/or receiver 130 may be configured to engage with a central base station either while in use or when not in use by user 101. Embodiments of the central base station may provide charging capability for peripheral detector 110 and/or receiver 130 as well as a network connection that provides the capability for peripheral detector 110 and/or receiver 130 to transmit data (e.g. via a wireless or direct connection) to other computing devices via the network and/or receive information such as software updates, detection parameters, security identifiers, etc. Further, some or all embodiments of a central base station may include a processor or microprocessor as well as data storage elements that may be particularly useful if a consistent network connection is not available.

Figure 2:
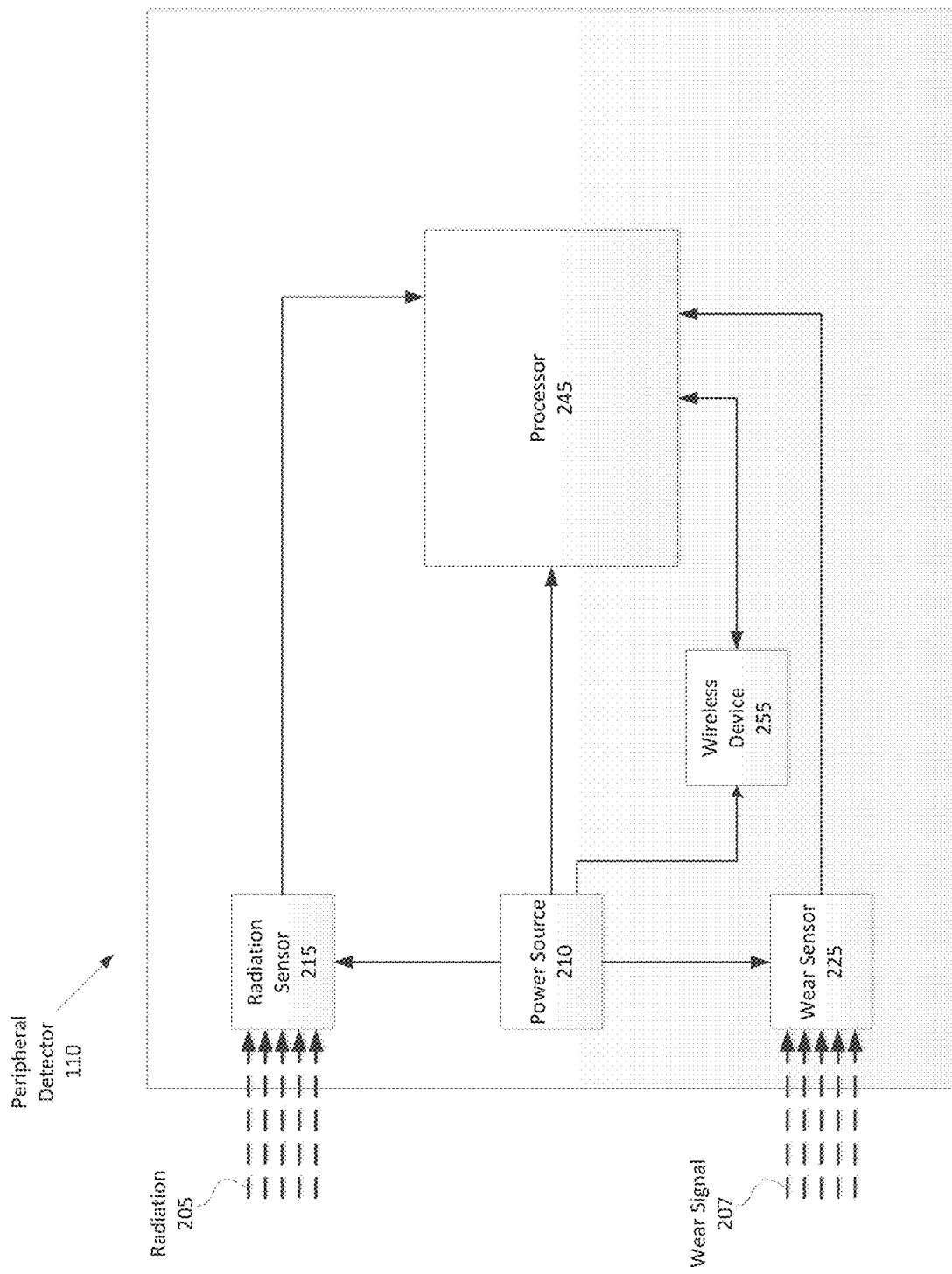
FIG. 2 is a simplified graphical representation of one embodiment of the peripheral detector of FIG. 1 that comprises a radiation sensor and a wear sensor.

FIG. 2 provides an illustrative example of peripheral detector 110 that is physically compact and light weight so that it can be comfortably worn by user 101 for an extended period of time and allowing full freedom of movement. In some embodiments, the physically compact nature enables peripheral detector 110 to be discreetly worn by user 101 and in some cases is not readily recognizable as a radiation dosimeter device. For example in some embodiments peripheral detector 110 is designed to be inconspicuous when worn by user 101 that enables use in covert applications.

Embodiments of peripheral detector 110 may include a wearable design that comfortably fits in close proximity to an extremity or head region for which radiation measurement is desired. Examples of wearable design include designs such as rings, necklaces, pendants, bracelets, ear pieces, glasses, or other type of accessory wearable in close proximity to an extremity or head region. Similarly, other examples of wearable design may include clothing designs such as gloves, hats, shoes, or other type of clothing design. In the present example, housing or packaging elements of peripheral detector 110 may be constructed of any suitable lightweight material such as a rubber, natural fiber, plastic, polymer, metal, glass, or other suitable material or combinations of materials.

As illustrated in FIG. 2, embodiments of the described invention include radiation sensor 215 that generates signals proportional to a dose exposure of radiation 205 experienced at the extremity and/or head region of user 101. In the described embodiments radiation 205 may include ionizing radiation such as X-rays, gamma-rays, beta particles and neutrons. FIG. 2 also illustrates wear sensor 225 that detects wear signal 207 and generates signals that indicates that peripheral detector 110 is being worn by user 101, and in some embodiments worn in the proper proximity to the extremity or head region for which radiation dose measurements are desired (e.g. to indicate that peripheral detector 110 is in use as a radiation sensor). For example, wear signal 207 may include one or more biological criteria such as temperature (e.g. temperature that substantially corresponds a body temperature when worn), bodily secretions (e.g. sweat), electrical activity (e.g. neuro-muscular activity), tissue density (e.g. via infrared optical detection), or other measurable criteria. In the present example, wear signal 207 may also include activity based signals detectable by elements such as an accelerometer (e.g. detect the motion of an extremity when worn by user 101) or pressure switch (e.g. detects pressure needed for user 101 to wear peripheral detector 110 such as with a bracelet).

In the same or alternative embodiments, wear signal 207 may also include accurate position-based information such as information that may include what is referred to as "received signal strength indication" (RSSI) technology. RSSI is a technology utilized in the telecommunications industry that typically includes a measurement of the power present in a received radio signal that may be expressed in decibels (dB) or decibels per milliwatt (dBm). For example, the RSSI measurement make include a range from 0 (zero) to −120 db and the closer it is to zero, the stronger the signal is. In the described embodiments RSSI may be used to accurately identify the position of peripheral detector 110 relative to one or more other devices (e.g. that may include receiver 130) carried or worn by the user 101 using the measurements of the relative strength of wear signal 207.

For example, peripheral detector 110 may include a wearable glasses format using RSSI or gravitational acceleration to accurately identify that the glasses are being worn and positioned over the eyes of user 101 rather than pushed to the top of the head, hanging from a pocket, or some other position on the body of user 101 that is not the intended position for detection of ionizing radiation exposure. In other words, the strength of wear signal 207 from one or more other devices may be detected by wear sensor 225 and processed by processor 245 to identify the specific position of peripheral detector 110 on the body of user 101 based on the measured strength of wear signal 207 and a known correlation of detected strength and position on the body relative to the one or more devices emitting wear signal 207. It will be appreciated that peripheral detector 110 may include a variety of wearable formats and thus the presently described example should not be limiting.

Alternatively, the signal emitted by wireless device 255 of peripheral detector 110 may be used by receiver 130 to compute the specific position on the body of user 101 using RSSI technology. For example, if the correlation between position of peripheral detector 110 on the body of user 101 and measured power detected by receiver 130 is known, then the specific position of peripheral detector 110 on the body of user 101 can be easily computed.

Importantly, both radiation sensor 215 and wear sensor 225 have low power requirements. In the embodiments described herein, the compact nature of peripheral detector 110 may limit the amount of power that can be stored in power source 210. Further, peripheral detector 110 may be required to operate over extended periods of time where very efficient power usage over time is advantageous. Therefore, it is highly desirable that all components of peripheral detector 110 consume as little power as possible during operation.

As illustrated in FIG. 2, both radiation sensor 215 and wear sensor 225 are in communication with processor 245. In the described embodiments, processor 245 may include any type of suitable processor/microprocessor, controller/microcontroller, or other type information processing device known in the related art or combinations thereof. Also, embodiments of processor 245 may include any of a variety of known memory storage devices that may include one or more library files stored thereon. Further, the memory storage devices may have control logic (computer software program, including program code) stored therein that, when executed by processor 245, causes processor 245 to perform functions described herein.

As illustrated in FIG. 3, embodiments of radiation sensor 215 typically comprise a detector 310, an amplifier 320, a signal processor 330, and one or more event counters 340. The detector 310 may include a semiconductor crystal, a PiN diode, a MOSFET (e.g. a metal-oxide-semiconductor field-effect transistor), a scintillating crystal with a photomultiplier, or other type of radiation sensor known in the relevant art. In other embodiments processor 245 includes some of these components such as the amplification and signal processor that converts analog signals corresponding to a degree of radiation 205 detected by radiation detector 310 to digital signals. Similarly, in some embodiments the amplification and signal processor converts analog signals that correspond to wear signal 207 detected by wear sensor 225 to digital signals. Further, some embodiments may also include one or more event counters 340 that record details from sensors 215 and/or 225 such as the number of detected radiation dose events and in some implementations whether the detected events occur when peripheral detector 110 is in close proximity to the extremity or head region of interest.

Also, some embodiments of processor 245 correlate data from radiation sensor 215 to data from wear sensor 225 to generate an accurate assessment of actual radiation exposure to user 101. Further, processor 245 may also correlate data from radiation sensor 215 and/or data from wear sensor 225 with data associated with security access as described above in order to correlate radiation exposure received by user 101 with specific locations. In some or all of the described embodiments processor 245 and/or a processing element of receiver 130 may integrate data received over a period of time for storage and later reporting (e.g. via receiver 130 or through the central base station to one or more computing devices as described above). For example, processor 245 may report the radiation exposure experienced by user 101 for an entire period that user 101 spends at a particular location.

For example for a calculation of radiation exposure to user 101, processor 245 may only include measurements from radiation sensor 215 captured during periods when wear sensor 225 indicates that peripheral detector 110 is being worn by user 101. In other words, if user 101 fails to wear the device during a shift where they might receive radiation exposure, it is possible to detect non-compliance both through the wear sensor 225 and the receiver 130, with the possibility to restrict access or use of the radiation source(s) to prevent unmonitored exposure. Conversely, even though radiation sensor 215 may record a radiation exposure level that may be reportable based on safety criteria, the event may not be considered significant for the calculation of radiation exposure for user 101 if peripheral detector 110 was not being worn or not being worn correctly (e.g. not in the correct position on the body of user 101) at the time of radiation exposure.

It will be appreciated by those of ordinary skill in the related art that some or all of the elements or functions described above may utilize various hardware or software/firmware configurations or combinations thereof. For example, processor 245 may include one or more software elements that provide processing capabilities for the features described above as well as other features such as generating communication packets of information for transmission via wireless device 255. Also in the presently described example, amplifier 320 and signal processor 330 may include one or more hardware elements and/or software elements or any combination of the two that provide the features described above.

FIG. 2 further illustrates an embodiment of wireless device 255 that may include a radio element and wireless antenna. Wireless device 255 may communicate with receiver 130 via any wireless technology known to those of ordinary skill in the related art and may depend, at least in part, on various criteria. The criteria may include, but is not limited to, range of transmission, data security, power requirements, physical dimension of radio and/or antenna, 1-way or 2-way communication, or other criteria. For example, direct device to device communication can be achieved using what is generally referred to as "Bluetooth" technology that has become a standard for exchanging data over short distances using short-wavelength UHF radio waves. Alternatively, wireless device 255 may communicate with receiver 130 via an intermediate. Some examples of communication intermediate using intermediate devices include what is referred to as Wi-Fi that communicates via wireless router devices and cellular based communications that utilize cellular communication points supported by a telecommunications provider. In the present example, wireless device 255 may use a text based communication (also referred to as "short message service" (SMS)) with receiver 130 or other communication protocol known in the art.

Again, both processor 245 and wireless device 255 have low power requirements. For example, processor 245 may utilize what is referred to as "solid state" components that typically have low power utilization characteristics. Similarly, wireless device 255 may utilize what is referred to as a "low power" or "ultra-low power" wireless transmitters known to those of ordinary skill in the related art.

Also as illustrated in FIG. 2, embodiments of the presently described invention include power source 210 that is compact and meets the power requirements of peripheral detector 110 for use over prolonged periods of time in various environmental conditions (e.g. hot, cold, etc.). Also in some embodiments power source 210 may be easily replaceable or alternatively may be permanently built into the structure of peripheral detector 110. In the described embodiments, power source 210 may include a rechargeable battery that uses a NiMH or Li-based chemistry. Similarly, power source 210 may include a replaceable primary battery that may or may not be rechargeable such as standard alkaline batteries or what may be referred to as a "high value capacitor" or "electric double-layer capacitor". Power source 210 may also include a combination of these elements, such as a primary battery plus a capacitor, or a primary battery plus a rechargeable battery, or other combinations known to those of ordinary skill in the related art.

In the embodiments described herein, peripheral detector 110 is in regular communication with receiver 130 to provide user 101 with real-time information on radiation exposure. The term "regular communication" as used herein refers to substantially constant communication or communication at short interval periods such as, for example, sending a communication at a period of about every 1 to 10 seconds. In some embodiments, the regular communication only occurs while peripheral detector 110 is worn by user 101 (e.g. as detected by wear sensor 225). In the described embodiments, radiation sensor 215 and the communications via wireless device 255 may be placed in a standby mode or shut off completely to conserve power during periods when peripheral detector 110 is not being worn or carried by user 101.

Having described various embodiments and implementations, it should be apparent to those skilled in the relevant art that the foregoing is illustrative only and not limiting, having been presented by way of example only. Many other schemes for distributing functions among the various functional elements of the illustrated embodiments are possible. The functions of any element may be carried out in various ways in alternative embodiments.

What is claimed is:

1. An active dosimeter system for detecting and communicating a radiation dose in real time, comprising:
    a peripheral detector configured to wear on an extremity or a head region of a user comprising:
        a radiation sensor configured to detect ionizing radiation;
        a processor configured to determine a level of the ionizing radiation; and
        a wireless device configured to send a transmission comprising the detected level of the ionizing radiation;
        wherein the determination of the level of ionizing radiation and the transmission occur in real-time; and
    a whole body dosimeter worn by the user and configured to receive the transmission comprising the detected level of the ionizing radiation from the peripheral detector, wherein the whole body dosimeter combines the level of ionizing radiation detected by the peripheral detector with a level of ionizing radiation detected by the whole-body dosimeter in real-time and comprises an interface that informs the user of the combined level of the ionizing radiation.

2. The system of claim 1, wherein:
the radiation sensor comprises a semiconductor crystal.

3. The system of claim 1, wherein:
the radiation sensor comprises a PiN diode.

4. The system of claim 1, wherein:
the radiation sensor comprises a MOSFET.

5. The system of claim 1, wherein:
the peripheral detector comprises a compact power source.

6. The system of claim 5, wherein:
the compact power source comprises a rechargeable battery.

7. The system of claim 6, wherein:
the rechargeable battery comprises a NiMH battery.
8. The system of claim 6, wherein:
the rechargeable battery comprises a Li battery.
9. The system of claim 5, wherein:
the compact power source comprises a high value capacitor.
10. The system of claim 1, wherein:
the peripheral detector is configured as a ring.
11. The system of claim 1, wherein:
the peripheral detector is configured as a bracelet.
12. The system of claim 1, wherein:
the peripheral detector is configured as a pair of glasses.
13. The system of claim 1, wherein:
the receiver is worn or carried by the user.
14. The system of claim 1, wherein:
the receiver is located within a range where the user can unambiguously identify a signal from the interface.
15. The system of claim 14, wherein:
the receiver is a smart phone or a tablet.
16. The system of claim 14, wherein:
the receiver comprises a wearable device with an interface that informs the user of radiation events.
17. The system of claim 16, wherein:
the wearable device comprises a ring.
18. The system of claim 16, wherein:
the wearable device comprises a bracelet.
19. The system of claim 16, wherein:
the wearable device comprises a wristwatch.
20. The system of claim 1, further comprising:
a wear sensor configured to detect when the sensor is worn by the user.
21. The system of claim 20, wherein:
the wear sensor is configured to detect temperature.
22. The system of claim 20, wherein:
the wear sensor is configured to detect electrical activity.
23. The system of claim 20, wherein:
the wear sensor is configured to detect bodily secretions.
24. The system of claim 20, wherein:
the wear sensor comprises an accelerometer.
25. The system of claim 20, wherein:
the wear sensor is configured to detect a specific position of the sensor on the user.
26. The system of claim 25, wherein:
the wear sensor utilizes RSSI technology.
27. The system of claim 20, wherein:
the wear sensor comprises a pressure switch.
28. The system of claim 1, wherein:
the extremity is a finger, hand or wrist.
29. The system of claim 1, wherein:
the extremity is a foot, ankle, or leg.
30. The system of claim 1, wherein:
the head region comprises an eye.
31. The system of claim 1, further comprising:
a central base station configured to engage with the peripheral detector and the receiver.
32. The system of claim 1, wherein:
the peripheral detector or the receiver comprises an access control element that enables the user to enter a location.
33. The system of claim 32, wherein:
the detected level of the ionizing radiation is correlated with the location.
34. The system of claim 33, wherein:
the detected level of the ionizing radiation at the location is integrated over a period of time.
35. The system of claim 34, wherein:
the period of time correlates to a period that the user spends in the location.
36. The system of claim 1, wherein:
the combined level of ionizing radiation from peripheral detector and whole-body dosimeter is stored as multiple dose variables in the user's dose record.

* * * * *